United States Patent Office 3,350,702
Patented Oct. 31, 1967

3,350,702
INFRARED DETECTION SYSTEM FOR FAULT ISOLATION AND FAILURE PREDICTION
Ruth A. Herman, Dayton, Ohio, assignor to the United States of America as represented by the Secretary of the Air Force
Filed Jan. 26, 1965, Ser. No. 428,273
2 Claims. (Cl. 340—228)

ABSTRACT OF THE DISCLOSURE

A system for detecting a faulty-operating electrical component by sensing and measuring variations in the infrared radiation emitted from the energized component. The detector comprises a bridge circuit having one arm formed by a thermistor that is positioned in thermal relation to the electrical component under surveillance. A normal energized electrical component is employed to initially balance the bridge circuit to a null condition. When the bridge circuit becomes subsequently unbalanced, it energizes a readout circuit to inform the operator of the faulty operating electrical component.

---

The invention described herein may be manufactured and used by or for the United States Government for governmental purposes without the payment to me of any royalty thereon.

This invention relates to infrared detectors sensitive to infrared radiation from energized resistive components and, particularly, to a system for fault detection isolation and failure prediction by using infrared radiation and a pattern recognition analysis.

Because its power is dissipated as heat, an energized resistive circuit is a distinct source of thermal infrared radiation. Among the potential sources of infrared radiation are the following resistive circuit elements: resistors, vacuum tubes, transistors, transformers, batteries, and lamps. Capacitors, under certain conditions, will also display infrared emission. Many of the components in an energized resistive circuit are characterized by individual normal operating temperatures, and this results in infrared patterns that can characterize the circuit as a whole during acceptable operation. Changes in the component temperatures develop into infrared patterns which represent the new operating conditions of the components in the circuits. By detecting these changes in the degree of infrared radiation and relating them to the circuit under inspection, a new method of fault detection and fault prediction becomes available. A particular advantage of this invention is that no power is drawn from the circuit under test.

Accordingly, an object of the invention is to provide a system for sensing precisely temperature changes in a resistive circuit, including a sequence of changes, so as to diagnose the faults in energized electronic circuits or other heat producing devices without changing the physical characteristics of the circuit or device under test.

Another object of the invention is to provide means for implementing a pattern recognition device through the novel use of thermistors, a monitor, and an indicator.

Still another object of the invention is to provide a system for detecting infrared changes through the use of infrared sensitive devices arranged in close thermal conducting relation with each of the elements to be monitored.

Still a further object of the invention is to provide a system for individually and continually sampling each of a plurality of thermistors by the use of small, lightweight, and reliable circuits having several elements in common.

Yet another object of the invention is to provide a system in which changes of infrared radiation are presented in the sequence and direction of occurrence through the use of a digital display or matrix.

Another object of the invention is to provide a system enabling precise identification of a faulty element within a device by means of a pattern recognition principle.

To achieve the foregoing objects, the invention comprises novel means for detecting, isolating, and predicting both catastrophic and noncatastrophic faults in heat generating devices and, particularly, primarily those appearing in electronic circuits. The particular use for which the invention is most advantageous is for continual observation of infrared radiation generating devices. Ordinarily, operationally inspecting a component for possible failure involves a direct electrical connection to the component and, therefore, its normal characteristics may be affected by the load. Furthermore, such checkout procedures cannot always conveniently be performed with the component operating in its normal environment and under its normal operating conditions. This invention poses an acceptable solution to these problems. According to the invention, continual observation of certain key components is provided, along with a highly effective and efficient method of fault diagnosis through pattern changes. Faults can be diagnosed through the knowledge of initial and subsequent pattern changes. In obtaining this fault diagnosis, the infrared pattern of a device is established both for normal conditions and for various conditions of faults. Thermistors are used to monitor the radiation from each of the elements under observation. The thermistors may be mounted directly on the key elements or arranged in close thermal conducting relation, and are individually monitored through a bridge network. A switching network relays the sequence and direction of change to a suitable conventional display. The pattern of changes is then compared with the pre-established pattern and the fault is diagnosed immediately. The fault diagnosis of many elements therefore is established by observing only a few of the elements.

A complete understanding of the invention and introduction to other objects and features not specifically mentioned may be had during the course of the following description when read in conjunction with the accompanying drawings, in which:

FIG. 1 shows an infrared radiation detection system embodying the invention;

FIG. 2 shows a fault recognition pattern chart useful for diagnosing component failures; and FIG. 3 offers another arrangement of fault detection apparatus.

Referring now to FIG. 1, thermistors 10 and 12 are connected in a bridge circuit generally designated 13 which includes resistors 14 and 16 and a source of unidirectional current, such as a battery 18. Thermistors 10 and 12 are of the type well known in the art, and each changes its electrical resistance in response to changes in internal temperature caused by heat energy conducted thereto or generated therein. Variable resistor 14 is used to balance the bridge. Thermistor 10 acts as a reference to compensate for changes in ambient temperature which simultaneously affect thermistor 10.

As will be understood in the following description, increasing the temperature of thermistors 10 and 12 causes a reduction in the electrical resistance thereof. Conversely, decreasing temperature causes its electrical resistance to increase. To permit infrared absorption, thermistor 12 is arranged in close thermal conducting relation with a schematically shown resistive component such, for example, as a resistor 20 whose operating temperature is to be continually sensed. No connections to resistor 20 have been shown, it being assumed that resistor 20 is energized by a current originating in any suitable external circuit not shown.

Thermistor 12 being disposed in the path of infrared radiation emanating from resistor 20, changes in the temperature of resistor 20 will be sensed in terms of directionally corresponding and proportionate changes in the temperature of thermistor 12, thus producing measurable changes in the electrical resistance thereof.

Initially, resistor 20 is observed to be operating satisfactorily in a normal manner. Bridge 13 is then balanced by adjustment of resistor 14. The output voltage at diagonally opposite output terminals 22 and 24 of bridge 13 is therefore substantially zero. A relay 25 is connected to output terminals 22 and 24 to detect when bridge 13 becomes unbalanced. Relay 25 may be of the three-position type well known in the art, and includes an armature for operating a movable contact $a$ suitably supported in a neutral position when relay 25 is deenergized and free to move toward either of two front and back contacts $b$ and $c$, respectively, and therefore engaging front contact $b$ for a current through relay 25 of one polarity and engaging back contact $c$ for current through relay 25 of the opposite polarity.

Assume that when the resistance of thermistor 12 decreases due to a temperature increase in resistor 20, the bridge 13 will become unbalanced in one direction such that current is caused to flow through relay 25 from right to left as seen in FIG. 1. In response, heel contact $a$ of relay 25 will move into engagement with front contact $b$. When the bridge becomes unbalanced in the other direction by a resistance increase in thermistor 12 caused by a lower temperature of resistor 20, current flow through relay 25 will be reversed, i.e., from left to right. Consequently, heel contact $a$ of a relay 25 will now close against back contact $c$.

The operation of the invention embodiment of FIG. 1 in response to a temperature increase in resistor 20 will be considered first. Accordingly, with heel contact $a$ engaging front contact $b$, current from a suitable unidirectional source, herein shown as a battery 26, is applied to an indicator relay 28 over a circuit extending from the ungrounded terminal of battery 26 and through a master reset switch 30, a back contact $b$ of a power disconnect relay 32, line 33, front contact $b$ of relay 25, and the winding of relay 28 to ground. With relay 28 energized, front contact $a$ thereof becomes closed thereby completing a stick circuit for relay 28 which extends from the ungrounded terminal of battery 26 and through master switch 30, lines 34 and 35, front contact $a$ of relay 28, and the winding of relay 28 to ground. The closing of front contact $b$ of relay 28 energizes a suitable indicator, herein conventionally shown as a lamp 36, by which through prominent mounting on a console or the like an unfavorable and significant change in the operating temperature of resistor 20 may be indicated. Lamp 36 is energized over a circuit which extends from the ungrounded terminal of battery 26 and through switch 30, lines 34 and 35, and lamp 36 to ground.

The closing of front contact $c$ of relay 28 completes an energizing circuit for relay 32 over a circuit extending from the ungrounded terminal of battery 26 and through switch 30, lines 34 and 35, front contact $c$ of relay 28, line 38, a control reset switch 40, and the winding of relay 32 to ground. With relay 32 energized, the closing of front contact $a$ thereof completes a stick circuit for relay 32 which extends from the ungrounded terminal of battery 26 and through switch 30, line 41, front contact $a$ of relay 32, switch 40, and the winding of relay 32 to ground. The opening of back contact $b$ of relay 32 interrupts the previously-traced circuit for energizing relay 28, however, relay 28 remains energized by virtue of the previously-traced stick circuit including front contact $a$ thereof.

The openings of back contacts $c$ and $d$ of relay 32 at this time disconnect from battery 26 all but the indicator lamp that initially has become energized. This has the effect of allowing the focus of maximum attention on the lamp giving the initial indication so that the pattern recognition which follows may be predicated on the accurate knowledge of which component led in giving an indication of a deviation from a normal operating temperature.

After noting which indicator lamp is the first to register, control reset switch 40 is opened. Relay 32 immediately becomes deenergized and the contacts thereof assume the positions as shown in FIG. 1. The closing of back contact $b$ of relay 32 in no way affects relay 28 at this time inasmuch as the previously-traced stick circuit for relay 28 including the front contact $a$ thereof remains closed. Accordingly, lamp 36 remains energized.

In a manner which hereinafter will be more fully described when the expansion of the bridge 13 to include a plurality of bridge circuits is taken up, the deenergization of relay 32 allows an immediate indication of all positive and negative temperature changes taking place in other resistive components similarly under observation and affected through circuit interaction. Thus, both initial temperature changes and subsequent temperature changes may be recorded since in all probability the initial indication provided by lamp 36 will be followed by changes in the operating temperatures of other resistive components, from which overall analysis a fault recognition pattern will emerge.

Master reset switch 30 is now opened. Obviously, all relays depending on battery 26 for energizing current become deenergized. Thus, the relay contacts assume their normal positions as shown in FIG. 1. Correction of the fault by replacement of the faulty resistive component permits bridge 13 to again be balanced. Relay 25 therefore becomes deenergized thereby returning its armature to the neutral position and opening the connection between heel contact $a$ and front contact $b$.

Assume now that the temperature of resistor 20 begins to decrease. Bridge 13 now becomes unbalanced in the opposite direction which reverses the flow of current through relay 25. As previously described, heel contact $a$ will engage back contact $c$. Energizing current for a second indicator relay 44 travels over a circuit extending from the ungrounded terminal of battery 26 and through switch 30, back contact $b$ of relay 32, line 33, back contact $c$ of relay 25, line 46, and the winding of relay 44 to ground. With relay 44 energized, front contact $a$ thereof becomes closed thereby completing a stick circuit for relay 44 which extends from the ungrounded terminal of battery 26 and through switch 30, lines 34, 47, and 48, front contact $a$ of relay 44, and the winding of relay 44 to ground. The closing of front contact $b$ of relay 44 energizes an indicator lamp thus showing that a temperature decrease in resistor 20 has taken place and that the bridge has become unbalanced in the opposite direction. Lamp 50 is energized over a circuit which extends from the ungrounded terminal of battery 26 and through switch 30, lines 34, 47 and 48, and lamp 50 to ground.

The closing of front contact $c$ of relay 44 completes a pickup circuit for relay 32 over a circuit extending from the ungrounded terminal of battery 26 and through switch 30, lines 34, 47 and 48, front contact $c$ of relay 44, lines 52 and 38, switch 40, and the winding of relay 32 to ground. It therefore is understood that relay 32 becomes energized when bridge 13 sufficiently becomes unbalanced in either direction. With relay 32 energized, the previously traced stick circuit for relay 32 over front contact $a$ thereof is completed. The opening of back contact $b$ of relay 32 interrupts the previously traced pickup circuit for relay 44. However, relay 44 remains energized over the previously traced stick circuit including front contact $a$ thereof.

In a manner hereinabove fully described, the openings of back contacts $c$ and $d$ of relay 32 at this time disconnect from battery 26 all but the indicator lamp that initially has become energized. In the illustrated case, lamp 50 exclusively remains energized, all others being deprived of energizing current by virtue of the action of relay 32. Control reset switch 40 is now opened. Relay 32 immediately becomes deenergized thereby returning the contacts thereof to the conditions shown in FIG. 1. The previously traced stick circuit for relay 44 remains intact. Accordingly, lamp 50 remains energized. Power from battery 26 over back contacts c and d of relay 32 now becomes available to other indicator relays through which the operating temperatures of other resistive components are being monitored.

Master reset switch 30 is now opened. Obviously, relay 44 along with all other relays energized by battery 26 become deenergized. After rebalancing bridge 13, quiescent circuit conditions are reestablished, thus calling for the deenergization of relay 25 and the opening of heel contact a and back contact b. Heel contact a therefore assumes the neutral position shown.

It is apparent that conventional solid state devices known in the art may be employed in lieu of the relays hereinabove described for directionally gating the changes induced by unbalancing each bridge and, therefore, it is to be understood that the electromagnetic relay structure typified in FIG. 1 is merely illustrative and is not intended as a limit to the invention.

Referring again to FIG. 1, the bridge detection system shown therein may be expanded conveniently into a number of independently acting bridges offering greater coverage for detecting changes in component temperatures. For example, using common elements such as battery 18, resistor 16 and reference thermistor 10, a second bridge indicated generally 13' is completed by the addition of thermistor 12' and variable resistor 14'. The diagonally opposite corners 24 and 54 of this bridge are connected to the terminals of a control relay 25' identical in all respects to control relay 25. It will be noted, for example, that the contacts associated with control relay 25' are identical to those shown with control relay 25. Furthermore, relays 28' and 44' are made to respond to engagement of heel contact a of relay 25' with front contact b or back contact c in response to temperature variations of a resistor 20' arranged in close thermal conducting relation with thermistor 12' and so disposed that infrared radiation from resistor 20' falls on thermistor 12'. Hence, changes in the temperature of resistor 20' will be reflected in temperature changes in thermistor 12' and corresponding currents through the winding of relay 25' in one direction or the opposite direction, in accordance with the direction in which bridge 13' becomes unbalanced. It will also be noted that the elements associated with the second bank of relays, i.e., relays 28' and 44' are identical to those elements associated with relays 28 and 44. Accordingly, the circuit components associated with only the first bank of relays, namely relays 28 and 44, have been fully referenced and described. It, therefore, will be understood that relays 28' and 44' and the components identified therewith will operate identically with corresponding elements illustrated in connection with relays 28 and 44 of the first bank.

Where it is desired to include in the system the elements associated with the second bridge 13', a connection between heel contact a of relay 25' and back contact c of relay 32 is necessary and is represented herein by reference number 55. Lines 56 and 58 also must be added as shown and correspond to lines 35 and 48, respectively. For still greater expansion to include a third observed resistor 20", thermistor 12" and variable resistor 14" may be connected to the common bridge elements. This expansion is believed self-explanatory and requires no further elaboration. However for such expansion, and any additional expansion which may be desired, it is necessary to connect the heel contact of the control relay associated with the bridge-output relay to a separate one of the back contacts of relay 32.

Variable resistor 60 controls the current level available for energizing each of the bridge-output relays. Resistor 60 should be so selected as to allow the smallest significant differential temperature of the observed resistive components to be on the order of about ±0.5° C.

FIG. 2 illustrates a fault recognition pattern based on the multiple temperature variation indications available from the invention embodiment of FIG. 1. For greater identification between the tabulated arrangement of FIG. 2 and the invention embodiment of FIG. 1, the charted resistive components R-20, R-20' and R-20" have been adopted to represent the three resistive components 20, 20' and 20", respectively, illustrated in FIG. 1. The tabulations of FIG. 2 ordinarily will be the result of actual experimentations with a circuit (not shown) in which resistors R-20, R-20' and R-20" are each affected in various degrees by significant changes in operating temperatures of the others. These results are obtained by disrupting normal operating conditions of the resistive circuit by deliberately introducing faults suggestive of the types of operational failures that reasonably could be expected to occur during actual operational conditions of the circuit, and then recording the manner in which the companion components are affected. In FIG. 2, therefore, the letter x identifies which of the observed components initially undergoes a significant change in operating temperature. This indication would come, of course, by observing which of the lamps in the invention embodiment of FIG. 1 is the first to become energized. The symbol "+" represents positive temperature changes, the symbol "−" represents negative temperature changes. Where no mark is shown, no variation in temperature of a component from normal operating conditions is concluded. Tracing now the steps by which the tabulations of FIG. 2 may most easily be interpreted, the observed component first to show the "x" indication is noted. Control reset switch 40 (FIG. 1) is then opened whereby all further positive and negative temperature changes are indicated by appropriate lights. The observed pattern is compared with the vertical columns of indications until one is found matching it. The component listed above the appropriate vertical column defines the faulty component. As an example, assume that the indicator associated with significant temperature variations in resistors R-20" is the first to register an indication and that, subsequent to opening of control reset switch 40, the indicators associated with announcing temperature variations in resistors R-20 and R-20' both show that the operating temperature of both these resistors has increased. Consulting FIG. 3 shows that the observed pattern matches the pattern found beneath R-20. Thus, looking upwards, R-20 is identified as the component whose debility has led to the operating temperature changes in the other two components.

In FIG. 3, the thermistors may be connected through a sequencer 62 to a controller 64. The thermistors are initially balanced in their respective bridge circuits with the terminals leading from thermistor 10 and the terminal identifying the connection to each of the observing thermistors 12, 12' and 12" representing diagonally opposite output corners for each bridge. When any of the bridges becomes unbalanced due to a significant deviation in component temperature, sequencer 62 will stop cycling by means of a control feedback pulse applied to line 65 in order to positively indicate the element initially experiencing the temperature shift. Subsequent temperatures changes of other components are indicated by having sequencer 62 resume its cycling. As previously described, it is advantageous to compare the observed pattern with a pre-established table in order to diagnose the faulty component.

It will be appreciated that the contribution of the invention to the art is to increase the probability of successfully detecting approaching or catastrophic failures of resistive components with a reliability strengthened by the described use of infrared detecting elements. The checkout or monitoring can be accomplished continuously even when the resistive element under observation is being used in its normal operating environment. The light or other alarm then warns of incipient failures as they occur. The advantage over other methods hereinbefore employed in that no special checkout system is necessary since when trouble occurs it is immediately detected and automatically indicated. Furthermore, failure can be predicted by detecting incipient temperature changes. Complete fault isolation of all elements of a device can be accomplished by observing only a fraction of the total number of strategic elements and using the pattern recognition approach to determine variations from normal operating temperatures. Finally, checkout of any heat producing device such as energized resistive components can be performed without introducing external loads to the circuit which normally affect the operating characteristics of the circuit under test.

Although only several embodiments of the invention have been described, it will be apparent to those skilled in the art that various changes and modifications may be made therein without departing from the spirit of the invention or the scope of the appended claims.

I claim:

1. A system for determining when an energized circuit element is faulty by sensing and detecting variations in the intensity level of infrared radiation emitted from said circuit element as compared with a pre-established intensity of infrared radiation emitted by a normal circuit element, said system comprising a bridge circuit, a first thermistor forming one of the arms of said bridge and adapted to be located in radiation receiving relation to said energized circuit element whereby said first thermistor varies in resistance when exposed to intensity changes of infrared radiation emanating from said circuit element, a second thermistor forming another arm of said bridge, a fixed resistor forming a third arm of said bridge, a variable resistor forming the fourth arm of said bridge whose resistance is adjusted to establish null conditions in said bridge under the condition of infrared radiation emanating from said normal circuit element, a voltage source connected across two of the four common junctions of said bridge, a first relay connected to the other two common junctions of said bridge normally deenergized and becoming energized during unbalancing of said bridge by a predetermined amount in either direction, said relay including first and second normally open contacts, said first contact being closed when current flow in said first relay is in one direction and said second contact being closed when current flows in the opposite direction, a second relay, a pickup circuit for said second relay including said first contact of said first relay, first indicating means controlled by a front contact of said second relay, a third relay, a pickup circuit for said third relay including said second contact of said first relay, and second indicating means controlled by a front contact of said third relay.

2. The system as defined in claim 1, further comprising a stick circuit for said second relay including a second front contact thereof, a stick circuit for said third relay including a second contact thereof, and a manually operable switch in said pickup and said stick circuits of said second and third relays opened to de-energize said second and third relays upon identification of the direction of heat radiating changes of said circuit element as displayed by the energized one of said indicator means.

References Cited

UNITED STATES PATENTS

| | | |
|---|---|---|
| 2,385,976 | 10/1945 | Evans et al. |
| 2,499,144 | 2/1950 | Jarvis. |
| 2,621,239 | 12/1952 | Cade et al. _____ 250—83.3 X |
| 2,686,293 | 8/1954 | Davis _____ 73—342 X |
| 2,697,215 | 12/1954 | Morris. |
| 2,718,148 | 9/1955 | Knudsen _____ 73—342 |
| 2,865,202 | 12/1958 | Bennett _____ 73—355 |
| 2,965,888 | 12/1960 | Johnston et al. |
| 3,194,962 | 7/1965 | Carlon et al. _____ 250—83.3 X |

FOREIGN PATENTS 354,500   7/1961   Switzerland.

LOUIS R. PRINCE, *Primary Examiner.*

F. SHOON, *Assistant Examiner.*